Feb. 16, 1971    I. WIEDER    3,564,453
LASER AND METHOD
Filed May 19, 1967    3 Sheets-Sheet 1
*Fig. 1*
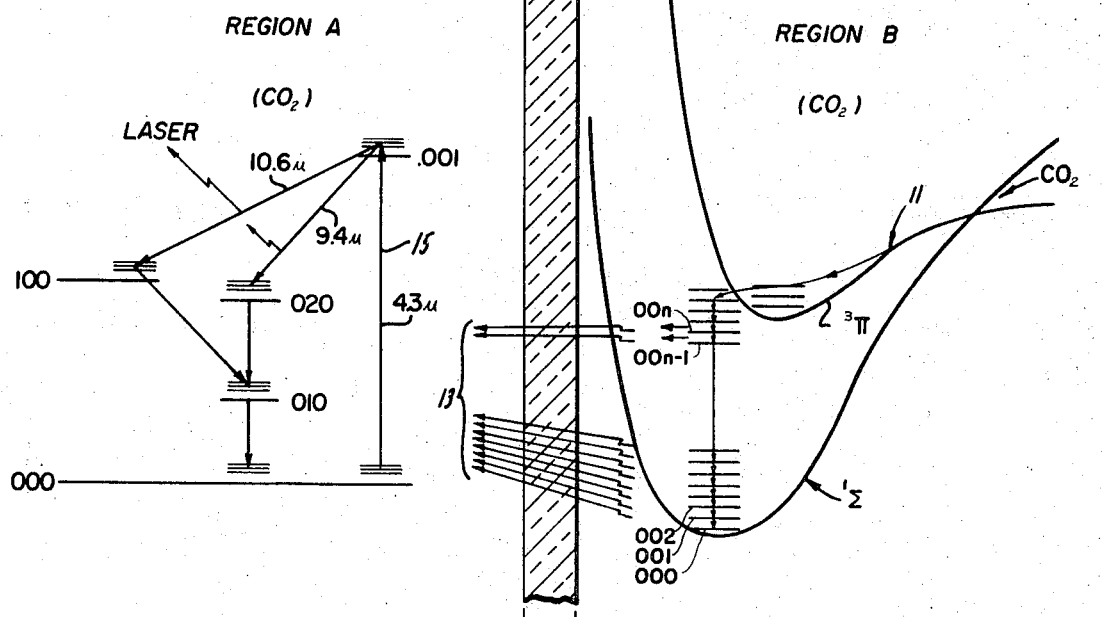
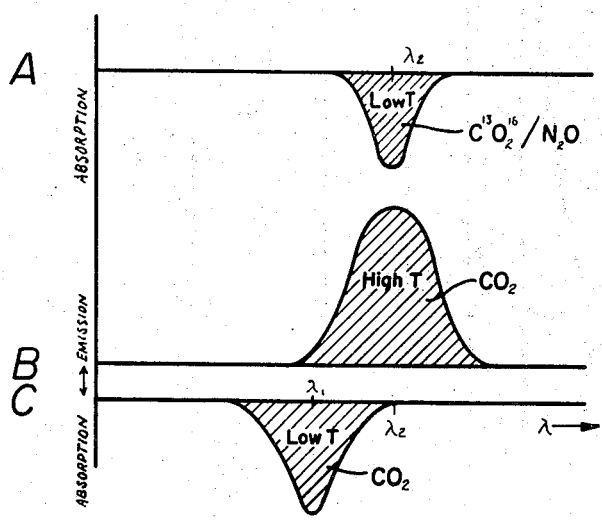
*Fig. 10*
INVENTOR.
Irwin Wieder
BY Flehr, Hohbach, Test,
Albritton & Herbert
Attorneys

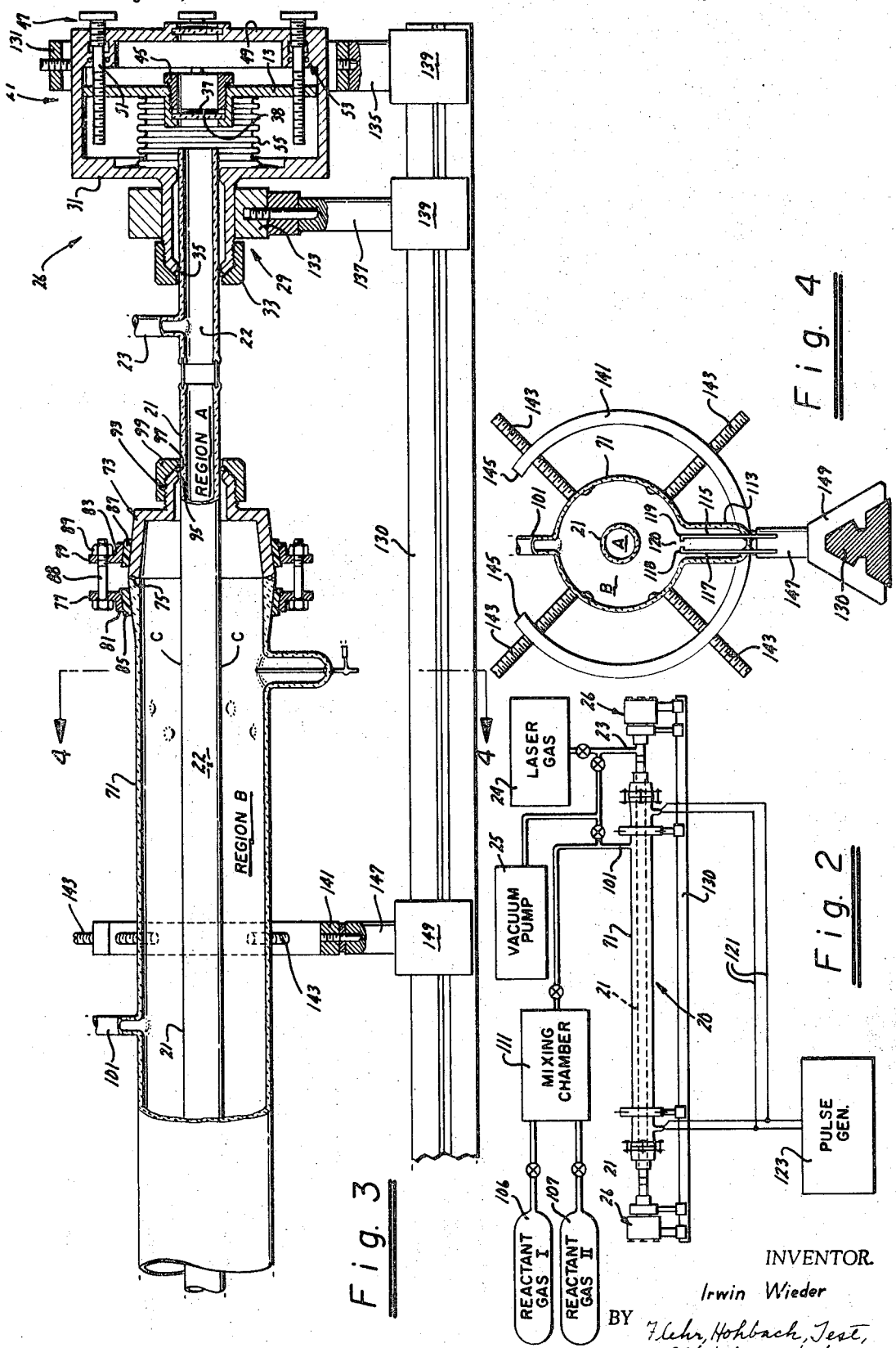

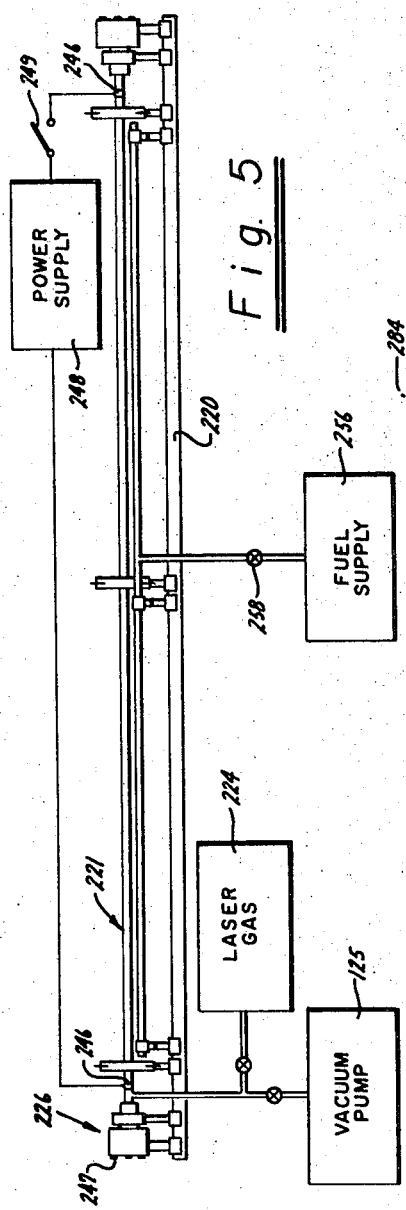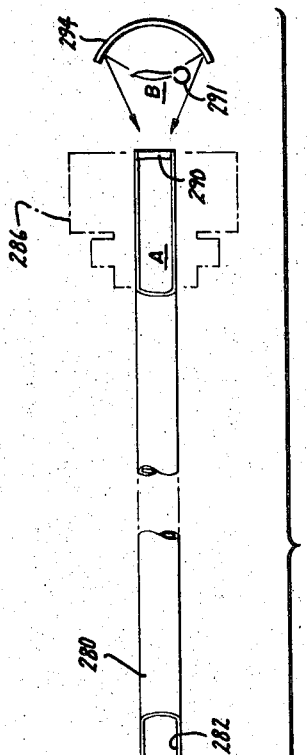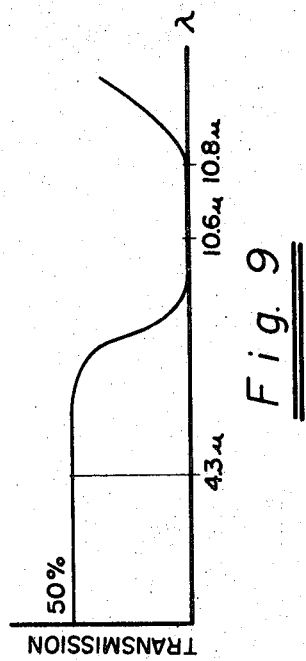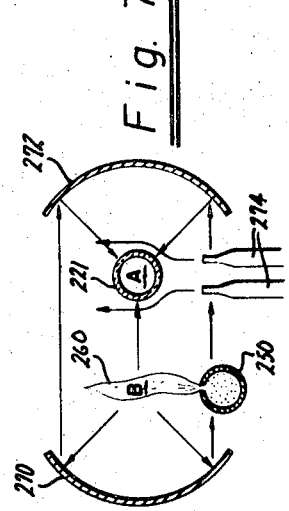
INVENTOR.
Irwin Wieder

United States Patent Office 3,564,453
Patented Feb. 16, 1971

3,564,453
LASER AND METHOD
Irwin Wieder, Los Altos, Calif., assignor to Carver Corporation, Mountain View, Calif., a corporation of Delaware
Filed May 19, 1967, Ser. No. 639,819
Int. Cl. H01s 3/00
U.S. Cl. 331—94.5    9 Claims

ABSTRACT OF THE DISCLOSURE

A laser using the characteristic radiations for a chemical reaction as the source of pumping energy. A tube including an optical cavity contains a gaseous laser medium which is optically coupled either transversely or endwise to a region in which gaseous matter is chemically reacting as by burning or exploding. Examples are given of a carbon dioxide laser medium pumped by a chemical reaction forming carbon dioxide from carbon monoxide or hydrocarbon gas and oxygen.

BACKGROUND OF THE INVENTION

This invention relates to a laser and method and more particularly to a laser and method in which the pumping energy is obtained from chemical reactions. As used herein, laser means an apparatus for the amplification and generation of coherent electromagnetic radiation by stimulated emission. The radiation can be of any suitable wavelength such as in the visible or microwave regions of the spectrum.

Gaseous state lasers have been commonly pumped by an electrical discharge through a gaseous laser medium. The output energy of such gaseous state lasers has been limited because it decreases when the electrical discharge power exceeds a critical value. Attempts to obtain greater output energy by using other methods of pumping have not been notably successful. For instance, present gaseous lasers utilizing optical pumping are limited in energy output principally because of the limited populations or energy states available in the useful pump transitions. In addition to the above, it is known that chemical reaction often produce large quantities of excited species which radiate characteristic electromagnetic radiations. Heretofore, such radiations have not been useful for providing laser energy. There is, therefore, a need for a new and improved laser and method.

SUMMARY OF THE INVENTION

In general, it is an object of the present invention to provide a new and improved laser and method which will overcome the above limitations and disadvantages by deriving the pumping energy thereof from chemical reactions.

Another object of the invention is to provide a laser and method of the above character in which matter is chemically reacted to create products in excited states which decay to states of lower energy and simultaneously radiate electromagnetic energy which is used as the pumping energy for the laser.

Another object of the invention is to provide a laser and method of the above character in which the chemical reaction can be either continuous burning or explosive reaction of gases.

Another object of the invention is to provide a laser and method of the above character in which the chemical reaction is arranged so that the development of the laser beam within the apparatus does not pass through the reacting matter.

In accordance with the above objects, the laser and method of the present invention utilizes a method of pumping in which the radiation output generated in chemically reacting matter is passed through a laser medium physically isolated from the reacting matter. The laser medium is selected to absorb radiation at the same frequency as that emitted from such reacting matter. The chemically reacting matter preferably results from the burning or exploding of reacting gases, the reaction products of which are formed in excited states. From these excited states the reaction products decay, emitting radiation of a characteristic wavelength. This radiation is passed through a transparent barrier physically separating the reacting matter from the laser medium and impinges upon and is absorbed by the latter. Sufficient species (molecules) in the laser medium absorb the radiation which passes through the barrier and in so doing shift to excited states and establish a population inversion. Upon decay the species emit a radiation possessing the second characteristic wavelength which is passed back and forth through the medium to cause the coherent stimulated emission of radiation therein. It is a particular feature of one embodiment of the invention that the species used in the laser region and the species used in the reaction region are preferably the same molecular species and are accordingly resonantly matched with respect to absorption and emission.

The above and additional objects and features of the invention will appear from the description in which the preferred embodiments are set forth in detail in conjunction with the accompanying drawings.

DESCRIPTION OF THE DRAWINGS

FIG. 1 shows an energy level diagram for the $CO_2$ molecules used in the illustrated embodiment of the invention.

FIG. 2 is a view partly in elevation and partly in schematic of a laser incorporating my invention and utilizing the radiation generated in an explosive reaction as the pumping source.

FIG. 3 is a detailed elevational view partly in section of one end of the laser of FIG. 2, the other end being symmetrically identical.

FIG. 4 is a cross-sectional view taken along the lines 4—4 of FIG. 3.

FIG. 5 is a view partly in elevation and partly in schematic of a laser incorporating my invention and utilizing the radiation emitted from a continuous flame used as the pumping source.

FIG. 6 is a cross-sectional view taken along the lines 6—6 of FIG. 5.

FIG. 7 is a cross-sectional view of a modified form of laser apparatus similar to that shown in FIG. 5 using reflectors.

FIG. 8 is a diagrammatic view of another modified laser apparatus in which the radiation from the reaction is end coupled into the laser region.

FIG. 9 is a graph depicting the transmission characteristic of the cavity reflectors of the laser apparatus of FIG. 8.

FIGS. 10A, 10B and 10C are graphs of the emission and absorption function of regions A and B as a function of frequency for selected gases.

DETAILED DESCRIPTION

General discussion

Referring to FIG. 1, there is shown portions of the $CO_2$ molecular energy diagram which serves to illustrate the laser and method of the invention. The laser is divided into two distinct regions, a laser region A and a reaction region B, physically separated from each other by a transparent barrier C. Region A encloses a latent gaseous laser medium for producing a laser beam when pumped with photons of a predetermined wavelength. Region A is bounded by a suitable optical cavity (hereinafter described) for reflecting radiation back and forth through the medium. Region B contains reactive matter and is optically coupled to the gas in region A. If desired, region A can further include electrical discharge electrodes for directly pumping the medium in region A to form a low level laser beam which is enhanced to higher powers by the radiation entering region A from region B.

The illustrated energy level diagrams depict a particular pumping scheme utilizing vibration-rotation energy levels of the carbon dioxide molecule for both the laser region A and the pump region B. Thus, region A contains a medium composed of carbon dioxide molecules to which can be added other molecules which aid in establishing and maintaining the required population inversion. Specifically, nitrogen can be added to store energy corresponding to the excited $CO_2$ population and helium to aid in depleting the intermediate energy states. Aside from the manner of excitation, region A operates substantially as a laser at 9.4 microns or 10.6 microns or both.

Briefly, region A operates as follows: $CO_2$ molecules are supplied with excitation sufficient to raise them from the vibrational ground state 000 to excited state 001. This excitation can be directly supplied as with radiation of 4.3 microns as in this invention or can be supplied by collisional exchange with excited species such as electrons, or vibrationally excited nitrogen molecules, which possess energies fairly nearly coincident with such 000→001 transition. Subsequently, the excited $CO_2$ molecules are stimulated to emit radiation at 10.6 microns or 9.4 microns as they drop from 001 to 020 or 100 vibrational levels respectively. The 020, 100 levels of $CO_2$ are depleted by collisional and radiative decay to the 010 level.

Referring to the reduced scale energy level diagram in region B (FIG. 1), line 11 indicates the results of a chemical reaction forming $CO_2$. Thus, let

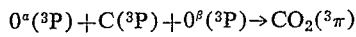

$$O^\alpha(^3P) + C(^3P) + O^\beta(^3P) \rightarrow CO_2(^3\pi)$$

represent the initial and final states of the species at the moment of reaction to form $CO_2$. As seen, the $CO_2$ is preferentially formed in the metastable $^3\pi$ state from which transference to high vibrational levels of the $^1\Sigma$ ground state is likely. As shown, the $^1\Sigma$ ground state possesses a multiplicity of levels of the $00n$ vibrational type. In general, there are three distinct modes of vibration for the $CO_2$ molecule so that vibrational states are written as $lmn$ where $l, m, n$ are integers or 0. In this particular case, however, we are concerned only with the group of states identified as $00n$, where $n=0, 1, 2 \ldots$. Because of the anharmonic nature in the potential energy curve the successive quantum jumps between vibrational levels $00n \rightarrow 00(n-1)$ in region B are shifter slightly so that the lowest transition for the dominant valence vibrational mode corresponds to a wavelength of about 4.3 microns while the highest bound vibrational transistors correspond to a wavelength of about 5.3 microns. As indicated by the arrow 12, the $CO_2$ molecule cascades downwardly through many of these vibrational levels. For each such quantum jump downwardly from level $00n$ to level $00(n-1)$, radiation is emitted having an energy lying between about 5.3 and 4.3 microns. The photons 13 emitted from the cascading $CO_2$ molecules pass through transparent physical barrier C and enter region A wherein they are absorbed and pump the $CO_2$ molecules in region A to the 001 vibrational level (line 15) to provide an excited population and laser action as previously explained.

The vibrational energy levels shown in FIG. 1 comprise a band of frequencies resulting from fine structure comprising a plurality of sub-levels which are associated with the rotational states of the molecule. Each vibrational transition cannot, therefore, be assigned a single energy value, but rather consists of a closely spaced set of values corresponding to changes in both the rotational and vibrational energy states. Thus, the cascading of the excited carbon dioxide molecules in region B from high vibrational levels to lower levels, and consequent emission of radiation occurs over a band of frequencies lying about 4.4 microns. Likewise, the absorption of energy of the carbon dioxide molecules in region A occurs over a bandwidth also associated with rotational sub-level fine structure.

Advantage is taken of this fine structure to permit greater coupling of energy between region B and region A. Thus, the emission transition from $00n \rightarrow 00(n-1)$ in region B and the absorption transition $000 \rightarrow 001$ in region A occur within overlapping bands of energy so that significant energy transfer can occur despite the shift to longer wavelengths in region B. Although the absorption can occur from many of the rotational sub-levels in the absorbing gas (region A), collisional relaxation between rotational sub-levels is found to be sufficiently fast compared with normal radiative processes that the population in 001 sub-levels condenses to a smaller number of rotational sub-levels (corresponding to the temperature of the gas in region A) before it lases. In addition, broadening of the absorption bandwidth in region A also results from using a pressure that is higher than optimum for laser action, were region A considered a discharge laser only. Thus, increasing pressure in region A can be used to enhance the optical coupling between A and B.

In region B, the output bandwidth can be varied according to the type of chemical reaction taking place therein. It has been found that for detonation reactions involving extremely fast explosions that the emitted bandwidth is broadened, the time of radiation shortened, and the intensity of radiation increased, in comparison with a burning reaction where the principal amount of energy of the emitted energy centers more narrowly about 4.3 microns.

Suitable gases for region B are explosive mixes of oxygen and acetyline and CO which can be burned in air. Pressure in region B can vary for explosive reactions from a few millimeters of Hg to several centimeters of Hg. Pressure of $CO_2$ in region A can vary from a fraction of a millimeter to several centimeters of Hg.

Apparatus explosion reaction

Referring now to FIGS. 2 through 4, an embodiment of the laser using explosive reactants in region B is illustrated. The laser 20 consists of an elongate cylindrical quartz tube 21 which is partially transparent to radiation over a band of wavelengths including 4.3 microns. The tube 21 is provided with an elongate cylindrical passageway 22 which extends therethrough and serves, together with the closure means hereinafter described, to define region A. The tube 21 is provided with a gas port 23 at one end thereof which is connected through suitable piping and valving to a source 24 of laser gas and to a vacuum pump 25. Thus, port 23 permits alternate evacuation and insertion of the laser medium into region A.

Closure means 26 is provided for forming an optical cavity through region A and for closing off each end of the tube 21. Such means 26 includes a cup-like member consisting of an enlarged cylindrical portion 27 and a small cylindrical neck 29 coaxially aligned with each other and connected together by a transversely extending wall 31. The neck has an inside diameter slightly larger than the outside external diameter of tube 21 so that the latter can pass into the neck and extend slightly into enlarged portion 27. The end of neck 29 away from wall 31 is threaded and adapted to receive a nut 33 for compressing an O-ring seal 35 into sealing engagement with the exterior of tube 21.

The enlarged portion 27 encloses a substrate 37, one surface 38 of which is optically ground and coated to form a reflective mirror. Substrate 37 is mounted for fine adjustment so that the optical cavity can be aligned and adjusted. Thus, substrate 37 is mounted in an open-bottomed well 41 formed in a plate 43 and is retained therein by a hollow plug 45 screwed into the well behind the substrate. Four adjusting screws 47 pass through a back wall 49 of the enlarged portion 27. Each screw carries a concentrically formed pin 51 which passes through an O-ring seal 53 and projects into the interior of the portion 27 in the same direction as tube 21. The pins 51 threadedly engage holes 54 provided in plate 43 so that the plate is adjustably supported on the pins, the mirror surface 38 being generally aligned with the interior of tube 21. Thus, turning of any of screws 47 provides a longitudinal movement of plate 43 and substrate 37 therein into the desired optical alignment. Suitable bellows 55 provide a gastight seal between the plate 43 and the inside of the wall 31 to complete a gastight region A.

The wall 49 of the cup member can be provided with a hole 57 therein, the hole being sealed off with a transparent window 59 for permitting radiation to exit from the laser. The reflectivity and shape of the surfaces 38 are selected according to known principles of optical cavity construction for lasers and may be spherical or flat as commonly used in forming confocal, hemispherical, or parallel cavity configurations.

The laser further includes a second tube 71 provided with an elongate cylindrical passageway 72 therethrough. Passageway 72 has a larger diameter than the external diameter of tube 21 so that the second tube can be concentrically mounted about tube 21. Tubes 21 and 71 together define the radial extent of region B in the form of a cylindrical shell surrounding region A. Region B is physically isolated from region A by the wall of tube 21, the transparency of which provides optical communication with the laser medium in region A. The inner surface of tube 71 may be coated with a highly reflective material such as gold for the purpose of increasing the amount of 4.3 micron radiation directed toward tube 21.

The outer wall at each end of the tube 71 is flared slightly to form a conical seat. A metallic cup 73 is coupled to tube 71 by an O-ring seal 75 therebetween and retained thereto by a pair of opposed cylindrical flange rings 77, 79 having foot portions 81, 83 with inwardly facing surfaces conforming to a conical outer surface formed on the cup 73 and to the conical seat on tube 71. Fiber washers 85, 87 having a like conical shape are interposed between the flange rings 77, 79 and the tube 71 and cup 73, respectively. The cup 73 and end of tube 71 are forced together by bolts 88 and nuts 89 connecting the flange rings to thereby compress the O-ring seal 75.

The other outer end of cup 73 is narrowed and provided with a short section 93 threadedly engaged by a coupling nut 99 which secures an O-ring seal 97 between section 93 and tube 21. A gas port 101 is formed through tube 71 for evacuating region B and permitting reactive gases to be introduced. Suitable piping 103 and valving 105 connect the passageway 101 to vacuum pump 25 and to sources 106, 107 of reactive gases through a premixing chamber 111.

Means is provided for initiating a chemical reaction in region B and includes a well 113 formed in the wall of the tube 71. A pair of electrodes 115, 117 pass through the bottom of well 113 and are sealed thereto by a conventional metal glass seal. Electrodes 115, 117 extend into region B and terminate in closely spaced portions 118, 119 forming a spark gap 120. The electrodes are connected through wiring 121 to the output of a pulse generator 123 capable of supplying sufficient energy to cause a spark to pass across gap 120 in the presence of the reactive gases within region B.

The laser is securely supported on an optical bench 130 at several points. Thus, at each end, closure means 26 are fastened to spaced mounting rings 131, 133 adapted to be secured about the enlarged portion 27 and neck 29, respectively. The mounting rings are fastened to and supported on blocks 135, 137 secured to runners 139 on the optical bench 130. Tube 71 is supported within rings 141 having a plurality of screws 143 passing radially therethrough and engaging tube 71. Each ring 141 is provided with an opening 145 at its upper side to facilitate removal of the apparatus. Each ring 141 is mounted to a support block 147 secured to a runner 149 on bench 130.

The parts of the laser are formed of suitably strong materials to withstand the reaction forces set up in region B. Glass tubing has been found satisfactory in some applications, such as low pressure (2 cm. Hg) acetylene-oxygen explosions. Typical data on one apparatus constructed according to the invention is as follows:

Tube 21:
    Length—4 meters
    Inside diameter—25 mm.
    Outside diameter—26 mm.
    Material—Fused quartz Tube 71:
    Length—3.5 meters
    Inside diameter—7 cm.
    Outside diameter—7.5 cm.
    Material—Pyrex

|  | Components |
| --- | --- |
| Region A (medium) | $CO_2/_{He}$ |
| Region B (reactive matter) | $C_2H_2/O_2$ |

In the operation of the device each of regions A and B is evacuated by being connected to vacuum pump 25. Subsequently, reactive gases are admitted from mixing chamber 111 into region B through piping 103. The laser gas from source 24 is admitted into region A. It will be noted that the laser gas fills tubing 21 and also fills closure means 26 so that the light passed between the reflecting surfaces of the optical cavity is in direct communication with the laser gas.

The electrodes 115, 117 then are pulsed to cause a spark to jump between them which initiates the reaction in region B, creating the excited species as hereinbefore explained. Radiation from the reaction in region B passes through tube 21 (barrier C) into region A exciting the modules therein to develop a population inversion. Re-emitted radiation from the excited molecules in region A is passed back and forth through the excited medium so that coherent stimulated emission of radiation results. After reaction, region B is evacuated and replenished with fresh gases and the steps repeated.

For some purposes, means can be provided for causing the detonating of the reactive gases to occur nearly simultaneously throughout region B. For this purpose, nodules 150 are provided on the inner side of the tube 71 and serve to create turbulence in the gases as the reaction zone passes the nodules. Such turbulence increases the propagation constant of the reaction and therefore makes the over-all reaction in region B more nearly simultaneous.

Flame (burning) reaction apparatus

Referring to FIGS. 5 and 6 in detail, there is shown apparatus for carrying out the invention utilizing continuous flame or burning reaction. The laser apparatus is entirely analogous to that shown in FIGS. 3 and 4 except that the tube 71 and associated coupling elements which serve to confine region B have been omitted and region B is defined by added elements. Accordingly, there is provided an optical bench 220 for supporting a cylindrical quartz tube 221 which is at least partially transparent to radiation over a band of wavelengths including 4.3 microns. Preferably tube 221 is made as transparent to the pumping radiation as possible to avoid heating of the tube and contained medium. This can be accomplished by the use of special windows (not shown) made of NaCl or KCl. Tubes 221 encloses a cylindrical passageway 222 which defines region A and is connected through gas port 223 to a supply 224 of laser gas and vacuum pump 225. After the tube is filled it can be sealed off if desired. Each end of tube 221 is closed with suitable means 226 and for forming an optical cavity along the tube 221, as hereinbefore described in detail. Suitable means are provided for adjusting the cavity and include adjusting screws 247. The optical cavity may be made in any of the suitable known shapes for the construction of lasers and one end of the tube may be made semi-transparent so that output energy may be taken from the device.

Cylindrical electrodes 246, 247 are incorporated into the tube near each end and are connected to a power supply 248 through switch 249. In this way an electrical discharge laser beam can be created for alignment purposes. Also, as later explained the discharge level can be set to a value at which incipient laser action exists which can be triggered to laser by the radiation from a chemically reacting matter.

Means is provided for supplying a suitable fuel to regions B spaced apart and adjacent to tube 221. For gaseous fuel, such means comprises a pair of spaced parallel burners 250, 252 positioned along each side of tube 221 and having a plurality of upwardly opening holes 254 therein for permitting gas to escape and flames 260, 262 to develop (FIG. 6). The burners 250, 252 are connected to a suitable source 256 of fuel such as carbon monoxide gas, as hereinafter explained. The gas which is delivered through the holes 254 burns to create flames 260, 262 which can be in the form of elongate sheets, as shown.

Experimental operation—Flame reaction apparatus

For the arrangement of FIGS. 5 and 6 utilizing carbon monoxide gas and oxygen reaction in region B, the following experimental arrangement was used. Tube 221 was made of quartz 4 meters long, 24 millimeters I.D., with a wall thickness of 1 millimeter and had a transmission of about 40% to 4.4 micron radiation. The cavity 226 mirrors had a radius of 20 meters and a 99.5% reflectivity at 10.6 microns. The mirrors are aligned by utilizing electrical discharge through the electrodes 246, 247 provided at each end of the tube 121 at a $CO_2$ pressure of 0.5 torr. The flame reaction used CO burning in air and was formed into thin sheets of flame having dimensions of approximately 4 meters in length by 10 centimeters in height by 1 centimeter in width using the the burners 250, 252 on each side of the tube at a distance of a few centimeters therefrom.

The apparatus shown in FIG. 5 can be operated either by using the flame reaction in region B as the sole pumping energy or by partial pumping with a pre-excited medium. By operating the medium in a pre-excited condition, the flame pumping is easily detected by observation of laser output as the flame is turned up. Heating of region A in tube 221 causes the laser to quench a few seconds after operation. Utilizing the energy from the flame alone and utilizing the full capacity of the burners an output power of 1 milliwatt was achieved. This output was quenched in a few seconds presumably by thermal heating of the tube 221.

FIG. 7 shows an arrangement in which the light from a flame 260 is concentrated and redirected into the tube 221 by elongated cylindrical mirrors 270, 272 positioned in general alignment surrounding the tube and flame 260. In this way the efficiency of the apparatus increased. Lenses and mirrors can obviously be combined to enhance the radiation coupling between regions A and B. Also shown are air jets 274 which maintain tube 221 at a given temperature and prevent it from being heated up by its proximity to the flame 260.

End pumping with continuous flame source

FIG. 8 shows, in diagram form, an arrangement for end pumping a $CO_2$ flame pumped laser in which a tube 280 is utilized having an evaporated gold coating 282 deposited along its interior for reflecting energy along the tube (region A). Each end of the tube is closed by suitable means 284, 286 forming an optical cavity and including partially reflective mirrors 288, 290 having transmissivity characteristic as shown in FIG. 9. Thus, mirrors 288, 290 are approximately 50% transparent to the pumping energy (4.3 microns) while being highly reflective to the energies (10.6 microns to 10.8 microns) of the laser.

At each end of the apparatus burners 291, 292, 293 are provided for burning a reactive gas. Mirrors 294 through 296 couple the radiation produced into the ends of cavity mirrors 288, 290. Mirrors 295, 296 and burners 292, 293 are spaced away from the axis of the tube 280 so that an output laser beam can be taken from the apparatus.

In operation, the gases in regions B may be ignited and burned as a continuous flame while their emitted radiation is focused into the latent laser of region A. Because of the endwise location of the regions B, they are more thermally isolated from region A so that undesired heating of the medium in region A is avoided, and greater efficiency is achieved due to the increased length of absorbing medium.

Selection of reactive matter and medium material—
resonance matching

FIGS. 10A, 10B, 10C show graphs depicting the envelopes of the emission and absorption characteristics of various species in regions A and B as a function of wavelength for carbon dioxide pumping system. As shown in FIG. 10A, region A is characterized, for $CO_2$, by an absorption curve having a peak at a wavelength indicated by $\lambda_1$. The $Co_2$ gas in region A is also characterized by having a low temperature, in contrast to the higher temperature of the flame in region B. This causes the latter emission curve (FIG. 10B) to have a maximum which is shifted to a different value indicated by $\lambda_2$. Graph 10C shows the absorption curve as a function of wavelength for a modified region A medium using $C^{13}O_2^{16}$ or $N_2O$. For the latter, the maximum of the absorption curve is shifted approximately $\lambda_2$ so that the resonances of the absorption and emission curves are matched. $C^{13}O_2^{16}$ is an example of achieving such matching by isotopic substitution and $N_2O$ is an example of another laser medium known to have an absorption peak located at the emission peak of the higher temperature flame.

Many materials should be available in the practice of the invention. The following are examples which illustrate various reactive matter suitable for use in region B, $CO_2$ being the laser medium in region A: (a) hydrocarbon gas (such as methane) burning in air or premixed with oxygen, and carbon monoxide premixed with oxygen, (b) a flame consisting of hydrogen gas burning with air and having a $CO_2$ gas core blown through it by a suitable jet results in a satisfactorily energized $CO_2$ gas for region B without the risks entailed in using and handling monoxide gas, (c) liquid fuels, such as methyl alcohol and ethylene. The resonance matching technique described above will be of value in increasing the coupling between regions A and B and are believed applicable to any system of gases having somewhat mismatched emission and absorption resonances.

Thus, there has been provided novel laser method and apparatus in which the energy of a chemical reaction is advantageously utilized to directly pump a laser medium. The chemical reaction is physically separated from the path of the laser beam so that effects created by the reacting species are not permitted to interfere with development of laser oscillations. Such effects may include very short duration phenomenon within the reacting medium, such as temporary opacity, index of refraction gradients, and undue absorption by short lived product species. Further advantage results from the ability to optimize conditions in region A to enhance laser action. Thus, pressures are established, selected, and maintained at values for which the laser medium possesses good optical properties in region A, and for which the reaction matter possesses optimum properties in region B.

I claim:

1. In a method for producing stimulated coherent emission of radiation the steps of placing a gaseous laser medium containing $CO_2$ in a first region bounded by an optical cavity, said medium being selected to lase when pumped with radiation of characteristic frequencies corresponding to a multiplicity of absorption lines resulting from transitions between rotational-vibrational energy levels of said medium, placing potentially chemically reactive matter capable of producing $CO_2$ molecules in excited states which emit a pump radiation corresponding to said absorption lines in a second region physically isolated from said first region, optically connecting said regions so that light emitted from matter within said second region impinges upon said first region, causing the reactive matter in said second region to chemically react by burning and forming a flame in which species in excited states are created and decay to emit said characteristics radiation which impinge upon the medium in said first region to pump the same.

2. A method as in claim 1 in which said reactive matter is a uniform mixture of hydrocarbon gas and oxygen which are reacted to form $CO_2$.

3. A method as in claim 2 in which said hydrocarbon gas is acetylene.

4. A method as in claim 1 in which said reactive matter includes carbon monoxide and oxygen which are reacted to form $CO_2$.

5. The method as in claim 1 wherein said reactive matter is a gas.

6. The method as in claim 1 wherein said reactive matter is a liquid fuel.

7. In a laser, means defining a first region having an optical cavity therethrough, a laser medium containing $CO_2$ disposed in said first region, means defining a second region, a transparent barrier physically separating said first and second regions but permitting the passage of radiation therebetween, means for burning reactive matter disposed in said second region to form a flame containing $CO_2$ molecules, said reactive matter being selected so that when burned it forms $CO_2$ molecules in excited states which emit characteristic radiations which impinge upon the medium in said first region and are absorbed to build up a population inversion in the medium, portions of the medium, upon decay, emitting a second characteristic radiation which is passed back and forth through the medium by reflection in said optical cavity to cause stimulated coherent emission of radiation with the medium in said cavity.

8. A laser as in claim 7 further including means for reflecting the radiation generated by said flame toward said first region.

9. In a laser, means including a $CO_2$ gaseous laser medium and cavity for producing laser oscillations when pumped with radiation of wavelengths about 4.3 microns, by absorbing such radiation and becoming excited to 001 vibrational state, and thereafter decaying to the 020 vibrational state or 100 vibrational state to emit radiation at about 9 to 11 microns, chemically reactive matter disposed in optical communication with the medium of said first named means, a transparent barrier physically isolating said reactive matter from said gaseous laser medium in said first named means, said reactive matter selected to chemically react to form $CO_2$ molecules in excited states which thereafter emit radiation at about 4.3–5.3 microns, which radiation is passed through said barrier and into said laser medium to excite the same.

References Cited

UNITED STATES PATENTS

| | | | |
|---|---|---|---|
| 3,414,838 | 12/1968 | DeMent | 331—94.5 |
| 3,393,372 | 7/1968 | Vickery et al. | 331—94.5 |
| 3,317,778 | 5/1967 | Timmerman et al. | 313—225 |
| 3,211,055 | 8/1965 | Andres | 331—94.5X |
| 3,435,373 | 3/1969 | Wolff | 331—94.5 |
| 3,443,243 | 5/1969 | Patel | 331—94.5 |
| 3,464,028 | 8/1969 | Moeller | 331—94.5 |
| 3,465,358 | 9/1969 | Bridges | 331—94.5 |

RONALD L. WIBERT, Primary Examiner

C. CLARK, Assistant Examiner